United States Patent [19]

Roberts et al.

[11] 3,968,378
[45] July 6, 1976

[54] ELECTRON BEAM DRIVEN NEUTRON GENERATOR

[75] Inventors: Thomas G. Roberts; Romas A. Shatas; John D. Stettler, all of Huntsville, Ala.

[73] Assignee: The United States of America as represented by the Secretary of the Army, Washington, D.C.

[22] Filed: July 11, 1974

[21] Appl. No.: 487,841

[52] U.S. Cl. .................................. 250/502; 176/5; 250/500
[51] Int. Cl.² ........................................ G21G 4/02
[58] Field of Search ............ 250/502, 500; 313/615; 176/5

[56] References Cited
UNITED STATES PATENTS

| | | |
|---|---|---|
| 3,005,767 | 10/1961 | Boyer et al. ........................ 313/615 |
| 3,071,525 | 1/1963 | Christofilos ........................ 313/615 |
| 3,302,026 | 1/1967 | Mallon et al. ...................... 250/502 |
| 3,526,575 | 9/1970 | Bennett .............................. 250/500 |
| 3,766,004 | 10/1973 | Roberts et al. .................... 250/502 |
| 3,864,640 | 2/1975 | Bennett .............................. 250/500 |

Primary Examiner—Harold A. Dixon
Attorney, Agent, or Firm—Nathan Edelberg; Robert P. Gibson; James T. Deaton

[57] ABSTRACT

An electron beam driven neutron generator which comprises an electron source connected to a beam forming and guiding section for guiding the electron beam to a target which is held by a portion of the beam forming and guiding section and in which the target has a magnetic field thereabout to control heat conduction by charged particles at the target to cause neutrons to be produced at the target by interaction of the output from the electron beam source and the material forming the target.

6 Claims, 3 Drawing Figures

ELECTRON BEAM DRIVEN NEUTRON GENERATOR

BACKGROUND OF THE INVENTION

For more than 20 years the research effort on controlled thermonuclear fusion has been dominated by problems associated with magnetic confinement. But, so far, all attempts to achieve useful controlled fusion energy released by these methods have been unsuccessful. Therefore, recently, there have been attempts to solve the controlled thermonuclear fusion problem by producing a microsize hydrogen bomb. To accomplish this it is necessary to replace the fissionable material (atomic bomb) which is used as a trigger by a small clean energetic trigger which is capable of producing the very high temperatures required to ignite a very small thermonuclear explosion within a small volume of dense T-D (tritium-deuterium) mixture Of course, the size of the explosion has to be limited in order to be controlled, but the energy released should be at least equal to that required to produce the trigger which may be as much as $10^9$ joules. Thus, the major problem in producing such a controlled microsize hydrogen explosion is to develop a trigger which is capable of dissipating a large amount of energy in a small volume of a dense T-D mixture within a very short time. This time is determined by the time required for the plasma to cool due to the mechanism with the most rapid rate of energy loss which may be different for different configurations.

An ideal trigger would then produce the necessary energy in a very short pulse which could be readily guided to the target and focused into the small volume of the target. The energy would be in a form such that it is totally absorbed by the small amount of target material preferably in a manner so that the target material is heated uniformly. Thus, because of the ease with which short pulse length, high power laser beams can be guided to targets and focused into small volumes, they have been considered as a trigger. These beams have been used to generate high temperature dense plasmas from which a few ($10^4$) neutrons have been obtained. However, the energy limit of currently available lasers imposes severe restrictions on their use for this purpose and even though the laser beams energy is rapidly absorbed in dense T-D targets it is absorbed near the surface only (even for targets of the size of say 50 microns in diameter) and the bulk of the target must be heated either by electronic heat conduction or by compression.

Relativistic electron beams possess energies several orders of magnitude larger than the best laser beams, and they also have been considered as a trigger. But, they have not been used in the past for this purpose because of the difficulties associated with focusing and guiding them to the targets, their relatively long pulse lengths (tens of nanoseconds), and their long energy deposition lengths in dense mixtures of T-D. In some considerations for the use of electron beams, geometrical configurations are depended on for focusing the electrons and such configurations have never worked in experiments.

Therefore, it is an object of this invention to provide an electron beam of more than $10^4$ joules and to focus the electron beam to a relatively small diameter and accurately guide the electron beam to a small target.

Another object of this invention is to provide electron beams of more than $10^6$ joules and to focus these electron beams to diameters of one mm or less.

Still another object of this invention is to provide a device for producing a trigger for a "controlled" thermonuclear explosion.

Still another object of this invention is to provide a device in which a trigger is used to produce a high temperature, high density T-D plasma which is contained for times long enough for the copious production of neutrons and for the release of thermonuclear energy.

Still another object of this invention is to provide a device in which the confinement time is determined by the rate of energy lost by radiation and to provide a device in which the radiation loss is low enough to allow the use of currently produced electron beams.

SUMMARY OF THE INVENTION

In accordance with this invention, an electron beam driven neutron generator is provided that includes an electron generating source such as a Marx bank driven flash X-ray machine operated in the electron beam mode, a specially tapered beam forming and guiding section such as a linear pinch tube device for producing a tapered plasma column, and a target which is held in an electrode of the linear pinch tube device. The target contains a material of tritium-deuterium from which neutrons can be produced. The target also has thereabout means for producing a magnetic field to slow down radial heat conduction by charged particles from the target. The tapered beam forming and guiding section is necessary to have a large diameter plasma at the window of the source of electrons and to have a small diameter plasma with fairly large magnetic fields at the target where the beam is delivered. Firing of the tapered beam forming and guiding section is correlated with firing of the electron source to cause the electrons from the electron source to enter the tapered beam forming and guiding section when the plasma column has a proper diameter at the target.

DESCRIPTION OF THE PREFERRED EMBODIMENT

Figure 1:
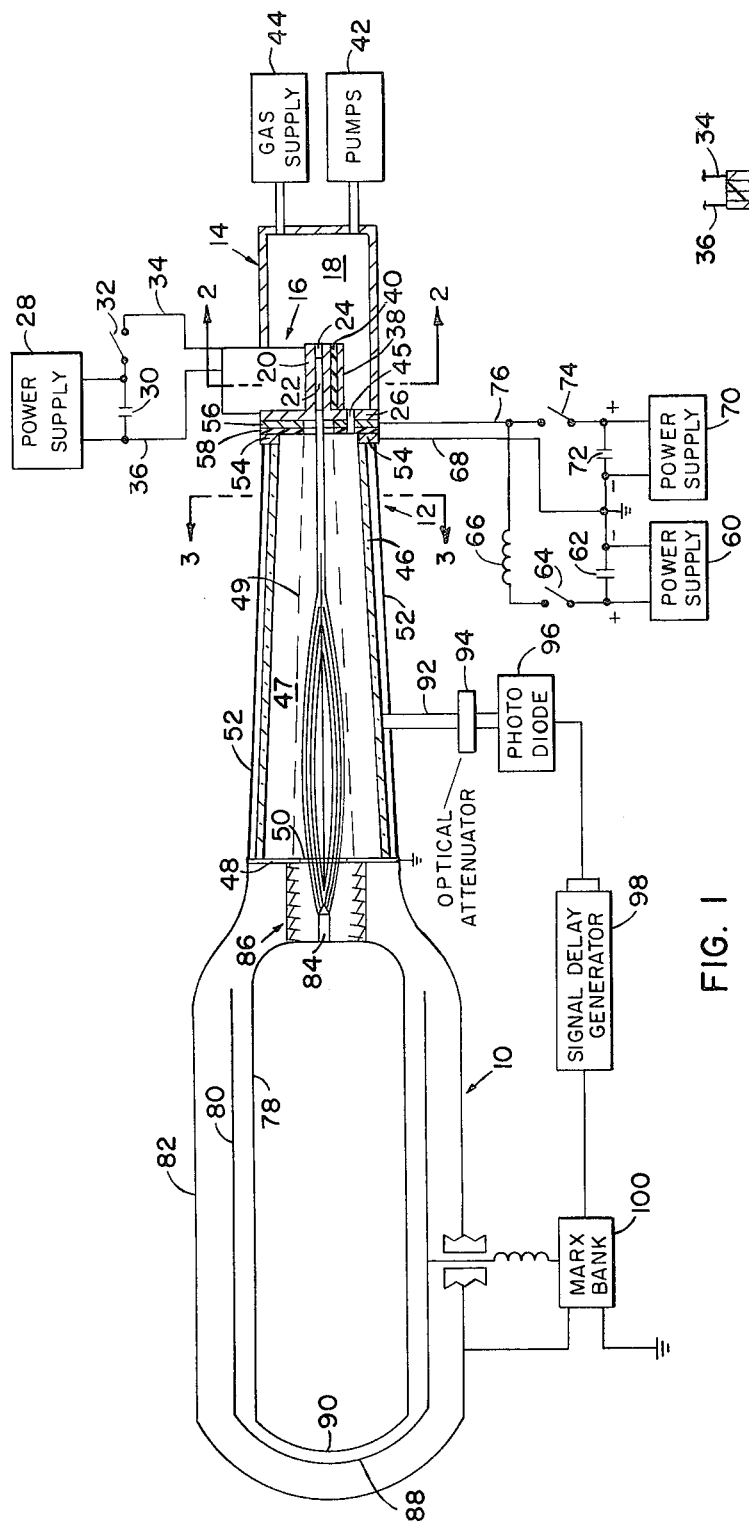
FIG. 1 is a schematic structural view of a neutron generator depicted in an operating condition according to this invention.

Referring now to the drawing, the apparatus according to this invention includes an electron beam source 10, a tapered beam forming and guiding section 12, body and target holding means 14 and magnetic field device 16 about the target. Body and target holding means 14 has a chamber 18 and target holder 20 with target 22 mounted in bore 24. Disc 26 forms one end of chamber 18 and holder 20 is integral with disc 26.

Figure 2:
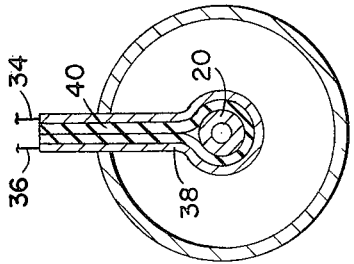
FIG. 2 is a sectional view along line 2—2 of FIG. 1.
Figure 3:
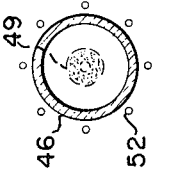
FIG. 3 is a sectional view along line 3—3 of FIG. 1.

Magnetic field device 16 includes a power supply 28 for charging capacitor 30 as illustrated and switch 32 is connected by leads 34 and 36 to electrical tape conductor member 38 (see FIG. 2) and insulating tape 40, such as mylar, insulates electrical member 38 from target holder 20. Pump 42 is used to evacuate tapered beam forming and guiding section 12 and chamber 18 through passage 45. Gas supply 44 is used to supply the gas to tapered beam forming and guiding section 12.

Tapered beam forming and guiding section 12 has a tapered glass wall 46, the taper of which will depend upon the length desired of the tapered beam forming and guiding section and upon the particular shaping of the electron beam passing therethrough to the target. Tapered beam forming and guiding section 12 also has an end conductor 48 that has a thin window 50 at the larger end of tapered beam forming and guiding section 12. A plurality of at least eight electrical leads 52 interconnect end conductor 48 and conductor 54 that is separated from small end conductor 56 by insulation 58. The electrical control for tapered beam forming and guiding section 12 includes power supply 60 for charging capacitor bank 62, preionization switch 64, coil 66 and lead 68 to ring 54. The electrical control also includes power supply 70 for condenser bank 72, main switch 74 which is connected to lead 68 and return lead 76 that is connected to end conductor 56.

Electron source 10 consists of an internal source of high energy electrons such as a modern flash X-ray machine operated in the electron beam mode, and as illustrated includes three coaxial cylinders 78, 80, and 82. Inner cylinder 78 is connected to high voltage terminal 84 of discharge tube 86. Rounded end 88 of intermediate cylinder 80 is close to rounded end 90 of inner cylinder 78. Outer cylinder 82 forms the wall of the cylindrical tank of the electron source which is filled with oil or an insulating gas everywhere except in the discharge tube. It is to be understood that other electron producing sources other than that illustrated can be used in this invention.

Control means for electron energy source 10 includes operationally connected light pipe 92, optical attenuator 94, photo-diode 96, and signal delay generator 98, and Marx bank 100 that is conventionally connected to electron energy source 10 as illustrated. Marx bank 100 as illustrated contains its own power supply and the Marx bank is normally charged being in condition for discharge upon the appropriate signal from signal delay generator 98.

In operation, tapered beam forming and guiding section 12 has chamber 47 thereof evacuated by pump 42 and then filled with gas supply 44 to have chambers 47 and 18 filled to the desired pressures with the gas to be used. The gas to be used in the tapered beam forming and guiding is argon or helium, but preferably argon. Target 22 of a deuterium-tritium mixture circuit placed in holder 20 prior to filling of chambers 47 and 18. Switch 32 of the magnetic field device is closed to switch a magnetic field about target material 22. Next, preionization switch 64 is triggered, and the gas in chamber 47 is ionized and becomes conducting by discharge of condenser bank 62 through inductor 66. That is, when switch 64 is closed, a circuit is completed through coil 66, lead 76, end conductor 56, the gas in chamber 47, end conductor 48, leads 52, conductor 54 and finally lead 68 to capacitor bank 62. Current flow in this cicuit preionizes the gas in chamber 47 and conditions it for a pulse from capacitor bank 72. A short time later, main bank swich 74 is triggered, the charge on condenser bank 72 is discharged through the low inductance circuit, and the ionized medium in chamber 47 begins to contract in diameter as illustrated by dotted lines 49 to form a tapered plasma column. When switch 74 is closed, capacitor bank 72 is discharged through lead 76, conductor 56, preionized gas in chamber 47, end conductor 48, leads 52, conductor 54 and finally lead 68 to the negative side of capacitor bank 72. When the light intensity in the tapered plasma column, as observed by light pipe 92, reaches a level set by optical attenuator 94, signal delay generator 98 begins to operate. A signal from signal delay generator 98 is then used to trigger Marx bank 100 of the flash X-ray machine which causes the power from Marx bank 100 to be applied in a conventional manner across coaxial cylinders 78, 80, 82 of the flash X-ray machine to produce a beam of electrons at electrode 84. This triggering of the flash X-ray machine 10 causes electrons to be generated and injected through thin window 50 of electrode 48 into chamber 47 and tapered plasma column 49 at the proper time. The electrons from source 10 entering chamber 47 are guided and focused down to a very small diameter at the exit end of tapered plasma column 49 as illustrated so that the small diameter stream of electrons will be centered on the target.

The target diameter and length is selected so that all of the beam's energy is absorbed. This energy then causes the temperature of the target material to be raised to a very high value, and this high temperature target material then produces neutrons for tens of nanoseconds until the plasma produced from the target material is cooled due to energy losses.

It is again pointed out that tapered beam forming and guiding section 12 which produces tapered plasma column 49 is very important in this device in that it causes the electron beam from source 10 to be picked up and focused. It is also important to note the one-dimensional expansion of the target which allows sufficient confinement time for use of the high energy electron beam from source 10. Magnetic field device 16 causes confinement of the energy radially so that heat conduction is also one-dimensional.

We claim:

1. An electron beam driven neutron generator comprising a target holder, a target of deuterium-tritium mounted in said target holder, coil means positioned about said target forming a magnetic field about said target holder and being of such a structure as to cause confinement of energy radially from said target so that heat conduction in said target is one-dimensional, a tapered beam forming and guiding section in the form of a linear pinch tube for producing a tapered plasma column and mounted relative to said target holder at one end, a source of high energy electrons from a machine mounted at another end of said beam forming and guiding section, and control means for said beam forming and guiding section and said source of high energy electrons to cause electrons from said source of high energy electrons to be injected into said tapered plasma column and cause said tapered plasma column to guide and focus said electrons in the form of a beam to said target holder as the plasma in said plasma column contracts, said target being of such a length and diameter that the energy from said source of high energy electrons is absorbed to cause the temperature of said target to be raised to a very high value and cause neutrons to be produced for tens of nanoseconds.

2. An electron beam driven neutron generator as set forth in claim 1, wherein said tapered plasma column is filled with a gas, and said gas is argon or helium.

3. An electron beam driven neutron generator as set forth in claim 1, wherein said magnetic field about said target holder is produced by a tape loop about said target holder.

4. An electron beam driven neutron generator as set forth in claim 1, wherein said control means for said beam forming and guiding section includes a circuit for said beam forming and guiding section in which a pre-ionization current is first passed to said beam forming and guiding section to produce a current sheath and in which a short time later, a main current is passed to said beam forming and guiding section to cause said current sheath to contract in diameter.

5. An electron beam driven neutron generator as set forth in claim 4, wherein said control means for said source of high energy electrons includes means responsive to said current sheath to cause said source of high energy electrons to be emitted in response to a predetermined current sheath condition being established.

6. An electron beam driven neutron generator as set forth in claim 5, wherein said beam forming and guiding section is a tapered plasma column filled with argon, wherein said source of high energy electrons is from a flash X-ray machine, and wherein said magnetic field about said target holder is produced by an electrically energized tape loop about said target holder.

* * * * *

UNITED STATES PATENT OFFICE
CERTIFICATE OF CORRECTION

PATENT NO. : 3,968,378
DATED : July 6, 1976
INVENTOR(S) : Thomas G. Roberts; Romas A. Shatas; and John D. Stettler It is certified that error appears in the above-identified patent and that said Letters Patent are hereby corrected as shown below:

Column 1, line 19, after "mixture" and before "Of" a --.-- should be inserted.
Column 3, line 48, after "guiding" --section-- should be inserted; line 49, "circuit" should be deleted and --is-- should be inserted therefor; and line 52, "switch" should be deleted and --establish-- should be inserted therefor.

Signed and Sealed this

Twelfth Day of October 1976

[SEAL]

Attest:

RUTH C. MASON
Attesting Officer

C. MARSHALL DANN
Commissioner of Patents and Trademarks